Jan. 16, 1923.
R. L. FARMER.
GAME SCHEDULE.
FILED JAN. 20, 1922.
1,442,390.
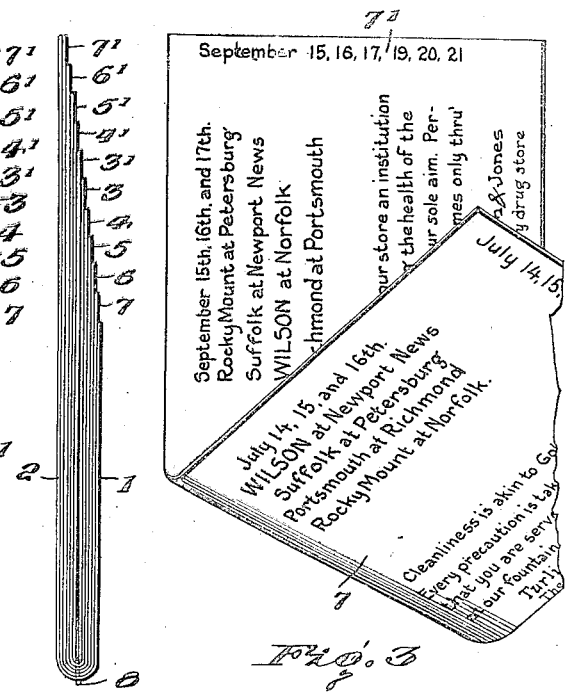

Patented Jan. 16, 1923.

1,442,390

UNITED STATES PATENT OFFICE.

REX L. FARMER, OF WILSON, NORTH CAROLINA.

GAME SCHEDULE.

Application filed January 20, 1922. Serial No. 530,553.

*To all whom it may concern:*

Be it known that REX L. FARMER, a citizen of the United States, residing at Wilson, in the county of Wilson and State of North Carolina, has invented certain new and useful Improvements in Game Schedules, of which the following is a specification.

This invention relates to baseball schedules, and more particularly to that class of schedules adapted to carry advertising matter in such a conspicuous position that the eye of the reader is forced to see the advertisements when reading the schedule.

An object of the invention is the provision of a schedule which is very simple and economical from a standpoint of production, yet which will readily indicate to the reader the several dates when the games are to be played, the contestants, and the city in which the events will take place.

Another object of the invention is the provision of such a schedule which may easily be carried in the pocket, yet which is so compacted that the arrangement of the advertising matter therein makes it a valuable asset when the complete schedule is exclusively used in advertisement of any one particular business concern.

In the following specifications, and in the drawings forming a part thereof, I have shown and described the schedule as applied to baseball games. It is to be distinctly understood however, that the invention is equally applicable to any schedule of future events of any nature whatsoever, so long as the dates, locations, and participants are known in advance.

In the drawings forming a part of this application,

Figure 1 is a front plan view of the schedule;

Fig. 2 is a side view showing the leaves of the schedule separated more than would be the case in actual use;

Fig. 3 is a perspective view showing both sides of one of the component leaves of the schedule, and Fig. 4 is a top plan view of the schedule opened in the middle, and showing one side of a full leaf.

The drawings show a schedule adapted for use in the Virginia baseball league, but it obviously is adapted for use in any other league, or in connection with any schedule series of events, provided the necessary changes in dates, names and cities are made.

In said drawings 1 indicates a front cover of relatively stiff paper or card board, and 2 a back for the schedules, said back being here shown as a continuation of or integral part of the front 1.

In the Virginia league, for which the schedule here depicted is adapted, the season is divided into two playing halves, the second half beginning on July 14th and ending Sept. 21st. This provides ten weeks of baseball during the latter half of the season, and it is for this half that the schedule herein described is adapted. In preparing my schedule therefore, I utilize five leaves, and each leaf is provided, on each side and at opposite ends, near its end margin, with a transversely extending row of dates covering six playing days. More specifically, on one side of a leaf, adjacent its right end margin, with a transversely extending row of playing dates covering six days; on the other side of the leaf, adjacent its left end margin, is another transversely extending row of playing dates covering six more playing days. Since each leaf covers two weeks' playing dates, it is obvious that the schedule herein shown is sufficient to cover ten weeks' play. For longer or shorter playing seasons the number of leaves utilized would vary.

As here shown the 5 leaves are numbered 3, 4, 5, 6 and 7, as shown in Fig. 2, each leaf being turned back to form the leaves 3', 4', 5', 6' and 7'. It will be noted that leaf 3 is folded back upon itself, and that 3' rests against the back thereof and that leaf 4 rests against leaf 3, and 4' against 3', etc., leaf 7 being adjacent leaf 6 and the front 1 of the schedule, and leaf 7' between leaf 6' and the back 2 of the schedule.

Fig. 3 shows leaves 7 and 7', and it will be noted that the leaf 7 shows dates from July 14 to 20, while leaf 7' covers Sept. 15 to 21; leaf 6 covers July 21 to 27, and leaf 6' covers Sept. 8 to 14, etc., until leaves 3 and 3' cover the two consecutive weeks from August 11 to 24.

In preparing the schedule the leaves are printed upon the front and back adjacent the margins, as before indicated. They are then laid upon the sheet forming the cover and back 1 and 2, with their edges overlapping, the bottom leaves projecting at the right end, and the top leaves projecting at the left end, as indicated by full and dotted lines in Fig. 4. Stitching 8 is then applied through all of the leaves, and through the cover and back sheet, at about the center line of the top leaf 3. The leaves and sheet are then bent along the said central line of leaf 3, transversely thereof, to form the cover 1 and the back 2, and the rows of dates on the backs and fronts of the leaves are brought into juxtaposition, as shown in Fig. 1, all of them projecting above the cover 1. By a glance at the schedule when taken out of the pocket, and without opening it, the user thereof immediately knows whether or not there is a game scheduled upon any certain date.

In order that the user of the schedule may conveniently ascertain where a certain game is to be played, and between what clubs, each of the leaves is provided with indicia setting forth the contestants and the city where the games are played. Specifically, leaf 3' shows on its front margin that games will be played on August 18, 19, 20, 22, 23, and 24, and, in the body of the leaf it states that, on August 18, 19 and 20, Richmond will play at Portsmouth, Suffolk and Norfolk, etc. For the last three days of the week, the data as to the contestants, and the places of the contest, appear upon the back of the leaf. This is true of all the leaves, and is clearly depicted in Fig. 3.

In actual use commercially, this schedule may be prepared to advertise one business concern, which concern gives away the schedules. Manifestly, it may advertise a plurality of concerns, but, in any event, each leaf carries upon each side, a phrase which is laudatory of the service rendered by the particular store or establishment which the schedule is advertising. It is to be noted that since the data relative to the place of the contest, and the names of the contestants, appears upon the bodies of the leaves, this data on each leaf is hidden either by the cover of the schedule or by one of the other leaves. It is therefore necessary to open the schedule to determine what contestants are involved, and where the games will take place. This is important, because the laudatory advertising phrases are immediately adjacent said data, and are forced upon the view of the user.

Modifications of this invention may be suggested to those skilled in the art, but I do not confine myself to the specific details here shown, except as required by an interpretation of the appended claims.

I claim:

1. A schedule of events to take place comprising a plurality of leaves provided with a transversely extending row of notations indicating the days when the events will take place, said leaves also carrying notations indicating the contestants and the place where the events will occur, the leaves being arranged in overlapping relation and disclosing the date notations in sequential relation.

2. A schedule of events to take place comprising a plurality of leaves secured in overlapping relation, each leaf being provided along its exposed upper margin with a notation of dates of future occurrence of certain events, the notations on each leaf being arranged in a relation which is sequential to the dates on the leaf immediately preceding it, and each leaf also bearing further notations indicating the place where said events will occur, and the participants therein.

3. A schedule of events to take place comprising a cover and a longer back, and a plurality of leaves held therebetween, said leaves being arranged in overlapping relation and having their margins exposed, the margins of each leaf carrying date notations in a relation which is sequential to the date notations on the margin of the preceding leaf, the combined margins of the leaves carrying date notations covering the whole season during which the events are to occur.

4. A schedule of events to take place comprising a cover and a longer back, and a plurality of leaves held therebetween, said leaves being arranged in overlapping relation and having their margins exposed, the margins of each leaf carrying date notations in a relation which is sequential to the date notations on the margin of the preceding leaf, the combined margins of the leaves carrying date notations covering the whole season during which the events are to occur, the body of each leaf also bearing further notations, indicative of the place where said events will occur, and of the contestants therein.

5. A schedule of events comprising a unit made up of a plurality of strips secured in overlapping relation, each of the component strips bearing on one side, adjacent an end margin, indicia denoting the time of said events, and similar indicia on its other side, adjacent its other end margin, said unit being folded upon itself, between the end margins of the strips, whereby the indicia on both sides of all the strips will be brought into parallelism and spaced relation.

6. A schedule of events to take place comprising a unit made up of a plurality of leaves secured in overlapping relation and folded to position the projecting marginal end portions of all the leaves in parallelism, the said marginal end portions of each leaf bearing indicia denoting the dates when said events are to take place, and the body of each leaf bearing indicia denoting the place of the event and the contestants therein, the body of each leaf also carrying laudatory advertising matter adjacent said last named indicia, and a cover for said leaves obscuring all of the leaves except the end margins thereof.

In testimony whereof I affix my signature.

REX L. FARMER.